US012805451B2

(12) United States Patent
Hodsdon et al.

(10) Patent No.: US 12,805,451 B2
(45) Date of Patent: Nov. 24, 2026

(54) FASTENING STRIPS WITH GRIP TABS

(71) Applicant: Velcro IP Holdings LLC, Manchester, NH (US)

(72) Inventors: Jerry G Hodsdon, Manchester, NH (US); Stephen R. Arata, Kingston, NH (US); Gregory K. Kopanski, Candia, NH (US)

(73) Assignee: Velcro IP Holdings LLC, Manchester, NH (US)

( * ) Notice: Subject to any disclaimer, the term of this patent is extended or adjusted under 35 U.S.C. 154(b) by 0 days.

(21) Appl. No.: 19/086,307

(22) Filed: Mar. 21, 2025

(65) Prior Publication Data

US 2025/0311679 A1 Oct. 9, 2025

Related U.S. Application Data

(60) Provisional application No. 63/575,059, filed on Apr. 5, 2024.

(51) Int. Cl.
*A01G 9/12* (2006.01)

(52) U.S. Cl.
CPC .................................... *A01G 9/128* (2013.01)

(58) Field of Classification Search
CPC ................................ A01G 9/128; A01G 17/08
See application file for complete search history.

(56) References Cited

U.S. PATENT DOCUMENTS 4,874,151 A 10/1989 Fritz
5,129,179 A * 7/1992 Kronmiller ............ A01G 17/12 47/42
5,168,603 A 12/1992 Reed
5,260,015 A 11/1993 Kennedy et al.
5,444,939 A * 8/1995 Cullen .................. A01G 9/128 24/442
6,044,525 A 4/2000 Sastre et al.
6,205,623 B1 3/2001 Shepard et al.
6,317,933 B1 11/2001 Suenaga
6,588,074 B2 7/2003 Galkiewicz et al.
6,622,346 B2 9/2003 Graham et al.
6,763,554 B1 7/2004 Torrey et al.
7,303,711 B2 12/2007 Gallant et al.
7,377,013 B2 * 5/2008 Cheung .................. A01G 17/12 24/30.5 P
7,587,796 B1 9/2009 Schultz
8,371,000 B1 2/2013 Schultz
8,413,306 B2 4/2013 Gallant et al.
8,545,740 B2 10/2013 Gallant et al.
9,386,824 B1 7/2016 Schultz
(Continued)

OTHER PUBLICATIONS

International Search Report and Written Opinion in International Appln. No. PCT/US2025/020833, mailed on May 30, 2025, 12 pages.

*Primary Examiner* — Jessica B Wong
(74) *Attorney, Agent, or Firm* — Fish & Richardson P.C.

(57) ABSTRACT

An elongated touch fastening strip of flexible material has mutually engageable touch fastener elements carried on the faces of the flexible material to releasably fasten overlapping portions of the fastener material together with the fastening strip wrapped about an object. The strip has a head end that extends asymmetrically toward one side of the fastening strip to form a lateral tab that can be gripped while the strip is wrapped about an object, such as to support growing plants.

20 Claims, 5 Drawing Sheets

(56) References Cited

U.S. PATENT DOCUMENTS

| | | | | |
|---|---|---|---|---|
| 12,172,811 | B2 | 12/2024 | Hodsdon et al. | |
| 2003/0224137 | A1 | 12/2003 | Chung | |
| 2005/0115147 | A1* | 6/2005 | Cheung | A01G 17/12 47/44 |
| 2006/0277723 | A1* | 12/2006 | Cheung | A01G 17/12 24/16 PB |
| 2008/0134573 | A1* | 6/2008 | Flaster | A01G 13/27 52/522 |
| 2010/0180537 | A1* | 7/2010 | Flaster | A01G 17/12 52/741.3 |
| 2014/0144076 | A1* | 5/2014 | Deeb | A01G 17/04 47/58.1 R |
| 2016/0286734 | A1* | 10/2016 | Deeb | A01G 9/122 |
| 2023/0115160 | A1* | 4/2023 | Torcellini | A01G 9/126 47/44 |
| 2025/0311820 | A1* | 10/2025 | Kopanski | A44B 18/0011 |

* cited by examiner

FIG. 2
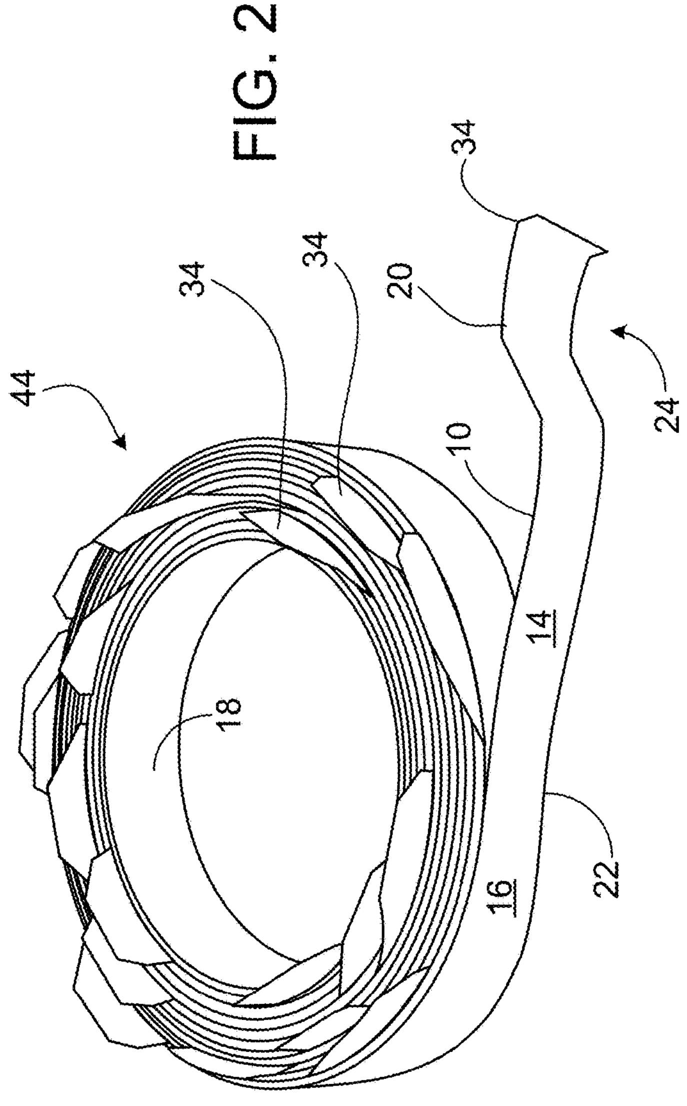
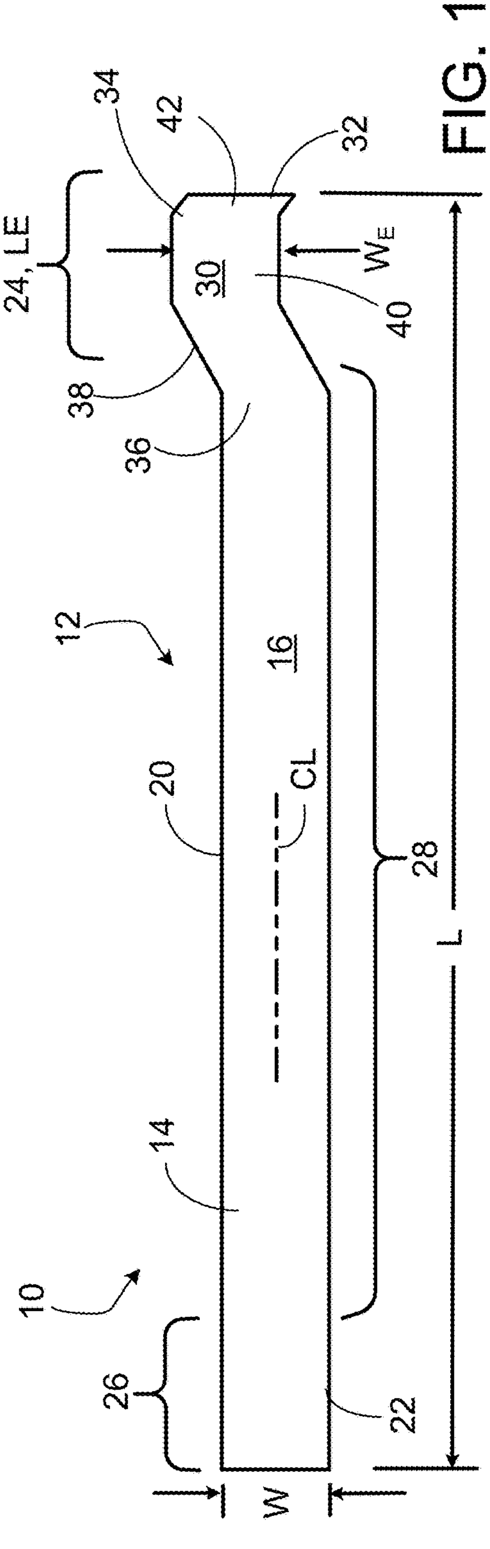
FIG. 1

FASTENING STRIPS WITH GRIP TABS

CROSS REFERENCE TO RELATED APPLICATION

This application claims priority to U.S. Provisional Application No. 63/575,059, filed Apr. 5, 2024, the entire content of which application is hereby incorporated by references in its entirety.

TECHNICAL FIELD

This invention relates to touch fastening strips in which one side of the strip is engageable with the other side of the strip, and to methods of wrapping such strips about objects.

BACKGROUND

Touch fasteners often feature an array of very miniature hooks, which can be of practically any shape so long as it has an overhang for snagging fibers, and a field of fibers configured to be releasably engaged by the hooks. Strips of fastening material are made that have one type of fastener element on each side, so that they can be wrapped about something and overlapped, with the two sides in direct engagement and forming a releasable fastening to hold the strip about the object. Such strips can be found in use in many applications, including agriculture and viticulture, where such strips can be used as ties to support a growing vine to a trellis or support cable in such a way that the tie does not hamper growth of the vine or damage the plant material. The tie can be removed and repositioned as needed.

Installation of such ties is usually a manual process. Improvements are sought to simplify and speed up the installation of such ties for agricultural use, and the installation of touch fastening strips more generally.

SUMMARY

Various aspects of the invention feature an elongated touch fastening strip having a body of flexible material with two opposite faces bounded by lateral edges extending along a length of the body of flexible material, and mutually engageable touch fastener elements carried on the faces of the flexible material to releasably fasten overlapping portions of the fastener material together with the fastening strip wrapped about an object. The body of flexible material has two opposite ends, including a head end and a tail end, and a central region connecting the two opposite ends, the lateral edges defining a nominal width therebetween in the central region. The head end has a contiguous area engageable over a width at least as great as the nominal width over an engageable head length, measured from a distal end of the head end opposite the central region, of at least half and no more than three times the nominal width. Notably, the head end extends asymmetrically toward one side of the fastening strip to form a lateral tab.

In some embodiments, the body of flexible material has an essentially constant lateral width over the engageable head length. In some cases, the body of flexible material is of the same lateral width over all of the length of the body of flexible material.

In some other examples, the head end is of greater lateral width than the nominal width.

The tail end, in some cases, has a distal portion that is of lesser lateral width than the nominal width.

In some embodiments, the engageable head length includes all portions of the head end of the strap in which the head end is asymmetric with respect to a centerline of the central region.

In some instances, the central region is straight.

In some cases, the lateral edges are linear throughout the central region. For example, the lateral edges may be parallel, such that the body of flexible material is of a constant width throughout the central region.

In some embodiments, the contiguous area is a convex region.

In some examples, the contiguous area is void of apertures extending through the body of flexible material.

In some embodiments, the contiguous area defines a slit extending into the area from an edge of the body of flexible material within the head end. The slit is preferably longer than a lateral width of the tail end of the body of flexible material.

In some examples, the lateral width of the head end plus the lateral width of the tail end equals twice the nominal width of the central region.

In some cases, one of the lateral edges includes a lateral edge segment bordering the contiguous area and parallel with the lateral edges in the central region.

In some cases, one of the lateral edges includes a leading lateral edge segment bordering the head end and extending at an oblique angle to a centerline of the central region. The oblique angle may be between 120 and 160 degrees, for example. The leading lateral edge segment may border the head end adjacent the central region.

In some embodiments, the mutually engageable touch fastener elements include both an array of male touch fastener elements covering one of the two opposite faces, and hook-engageable fibers disposed on the other of the opposite faces. The array of male touch fastener elements may include parallel columns of male touch fastener elements extending along the length of the body of flexible material.

Each of the male touch fastener elements may have a stem of resin extending from and contiguous with a layer of resin on said one of the two opposite faces. In some instances, the layer of resin covers said one of the two opposite faces.

In some embodiments, both the head end and the tail end are both offset laterally with respect to a center line of the central region. In some cases, both the head end and the tail end are both offset laterally toward a common side of the fastening strip.

In some examples, the elongated touch fastening strip is releasably connected to other fastening strips to form a set of fastening strips wrapped up as a roll of fastening strips and held in roll form by the mutually engageable touch fastener elements.

One aspect of the invention features a sheet of fastening material die cut to define multiple fastening strips as described above.

In some embodiments, the sheet of fastening material is wrapped up as a roll of fastening strips and held in roll form by the mutually engageable touch fastener elements.

In some cases, the fastening strips of the sheet are arranged with a head end of one fastening strip adjacent and connected to a tail end of an adjacent fastening strip.

In some examples, the lateral edges of adjacent fastening strips of the sheet are adjacent and connected.

In some instances, the opposite faces of the multiple fastening strips of the sheet of fastening material together form opposing faces of the sheet of fastening material.

In some embodiments, the multiple fastening strips are arranged in a nesting pattern, such that the sheet of fastening material is void of fastening material sections that are not part of one of the fastening strips.

Another aspect of the invention features a method of installing a touch fastening strip to support a portion of a growing plant. The method includes placing the elongated touch fastening strip described above adjacent a portion of a growing plant and a plant support, gripping the lateral tab of the strip with one hand, wrapping a remainder of the strip about the growing plant portion and the plant support while continuing to grip the lateral tab, such that the wrapped strip overlaps itself to engage the mutually engageable touch fastener elements and hold the strip in wrapped form, and then releasing the strip.

Various embodiments of the invention can speed up the manual installation of touch fastening strips by providing a lateral extension at one end of the strip that can be gripped while the remainder of the strip is wrapped to overlap itself while gripping the lateral extension. By providing the extension only on one side of the strip, the strips can be die cut in a nested arrangement from a sheet of fastening material, to avoid waste.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 1 is a top view of an elongated touch fastening strip.

FIG. 2 is a perspective view of a roll of the touch fastening strips of FIG. 1.

Like reference symbols in the various drawings indicate like elements.

DETAILED DESCRIPTION

Figure 3:
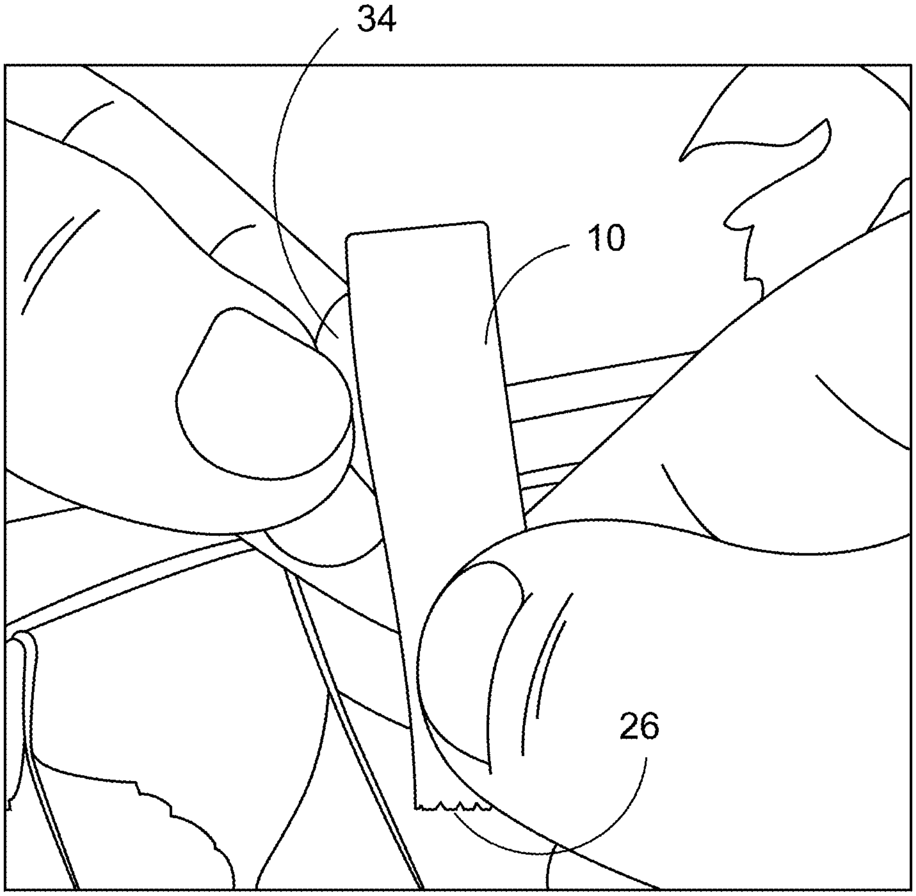
FIG. 3 illustrates the touch fastening strip of FIG. 1 being wrapped around a supporting wire and a vine.

Referring first to FIG. 1, an elongated touch fastening strip 10 has a body 12 of flexible material 14 with two opposite faces (16 showing and 18 on the obverse). The body is bounded by lateral edges 20 and 22 extending along the length of the body of flexible material. As will be discussed in more detail below, the strip has mutually engageable touch fastener elements carried on the faces of the flexible material, to releasably fasten overlapping portions of the fastener material together with the fastening strip wrapped about an object. The body 12 of flexible material has two opposite ends, including a head end 24 and a tail end 26, and a central region 28 connecting the two opposite ends. The lateral edges define a nominal width 'W' between them in the central region. By 'nominal width' we mean a dimension measured perpendicular to the overall length dimension of the strip. For a strip of essentially constant width, as in strip 10, we mean the actual width. For a strip of varying width we mean the typical or mean width.

The head end 24 features a contiguous area 30 engageable over a width "$W_E$" at least as great as the nominal width over an engageable head length '$L_E$', measured from a distal end 32 of the head end opposite the central region 28, of at least half and no more than three times the nominal width 'W'. By an engageable contiguous area we mean an area that is unitary and that it is essentially covered with touch fastener elements, whether hooks or loops. In the example of strip 10, the contiguous area 30 has a width '$W_E$' at any point along its length that is essentially equal to the nominal width 'W' of the central region, and that is engageable over that width over an engageable head length '$L_E$' approximately twice the nominal width. In this example, the body 12 of flexible material has an essentially constant lateral width '$W_E$' over the engageable head length '$L_E$'. In fact, the body of flexible material is of the same lateral width over all of the length of the body of flexible material, with parallel lateral edges throughout the central region. The central region 28 in this example is straight, and the lateral edges 20,22 are linear throughout the central region. The engageable head length '$L_E$' includes all portions of the head end 24 of the strip in which the head end is asymmetric with respect to a centerline 'CL' of the central region.

In this example, the contiguous area 30 is void of apertures extending through the body of flexible material, and is engageable over its entirety. Moreover, it is engageable over its entire width over its engageable head length, meaning that at any point along its engageable head length it is engageable across its entire width. The engageable area need not extend across the entire width of the head end of the strip, meaning that there may be non-engageable edge regions in the head end.

As visible in FIG. 1, the head end 24 extends asymmetrically toward one side of the fastening strip 10 to form a lateral tab 34. That is to say, the head end extends to one side of the strip more than to the other side, in the transverse or lateral direction. In this example, the head end and the contiguous area can be said to be formed in three adjacent parts: a first part 36 extending from the central region 28 and having leading lateral edge segments 38 that are angled with respect to the centerline 'CL' of the central region, a second part 40 that is essentially square in shape and with lateral edge segments that run parallel to the centerline, and a third part 42 that angles back toward the centerline and that forms the distal end 32 of the head end of the strip. Leading lateral edge segments 38 border the head end adjacent the central region and extend at an oblique angle Θ (see FIG. 11A) to a centerline of the central region. The remainder of the strip (the tail end 26 and the central region 28) together form an elongated, rectangular piece of the flexible material.

The lateral edges 20 and 22 of the strip are formed by severing as a sheet of the material is die cut into the shape shown. The two opposite ends, on the other hand, are formed by tearing the material along perforation lines. Thus, a long chain of strips can be die cut from a continuous running length of the material, with perforation lines formed at spaced intervals to define individual strips. The chain of strips can then be rolled up into a stable roll 44, as shown in FIG. 2. As rolled, the lateral tabs 34 of the strips project from one side of the roll. As needed in the field, a last strip of the roll can be unwound from the roll and pulled to tear through the perforation joining it to the next strip.

Figure 4:
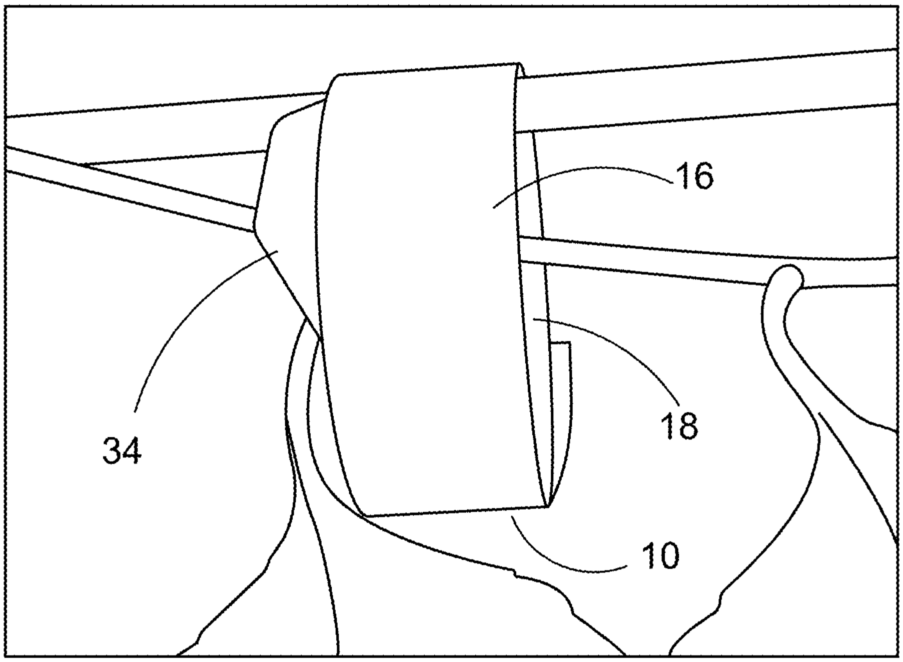
FIG. 4 shows the touch fastening strip after wrapping.

The lateral tabs 34 of the strips facilitate manual wrapping of the strips about, for example, vines and support wires, to hold up the vines or other plant material without compressing or unnecessarily restraining the vines. As shown in FIG. 3, the lateral tab 34 is held by one hand, such as between thumb and forefinger, while the tail end of the strip is wrapped about an adjacent vine and support wire, to overlap at least the head end of the strip. Alternatively, the tab can be pressed against the support wire with one finger as the strip is wrapped upon itself. The overlapped strip is held in that wrapped configuration by cooperative effect of the mutually engageable fastener elements on the opposite surfaces, leaving the lateral tab 34 uncovered, as shown in FIG. 4. The vine can thus be wrapped loosely, with plenty of room for growth. The presence of the lateral tab 34 permits the head end of the strip to be held without interfering with the wrapping of the rest of the strip over the head end. This can speed up manual installation of such strips and help to ensure face-to-face contact over the entire overlapped length of each strip.

Figure 5:
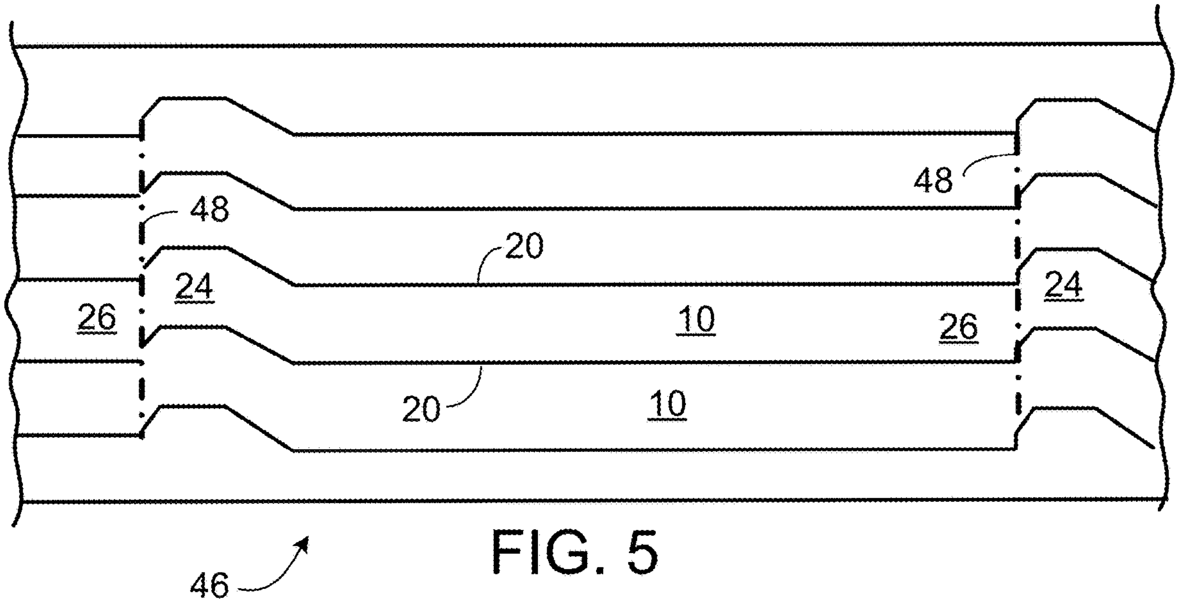
FIG. 5 is a top view of a sheet of fastening material die cut to form multiple touch fastening strips.

Referring next to FIG. 5, a sheet 46 of fastening material is die cut to define multiple fastening strips 10. In this example, four adjacent longitudinal rows of strips are produced, leaving only selvedge regions of the sheet as waste. In each row, the head end of one strip is connected to the tail end of an adjacent strip by a perforated cut 48 to form a frangible tear line. The lateral edges 20,22 of adjacent fastening strips of the sheet are adjacent and connected, and the opposite faces of the multiple fastening strips of the sheet of fastening material together form opposing faces of the sheet of fastening material. From the sheet 46, each row of strips can be split out into a separate chain of strips and rolled up to form a roll 44 as in FIG. 2.

Figure 6:
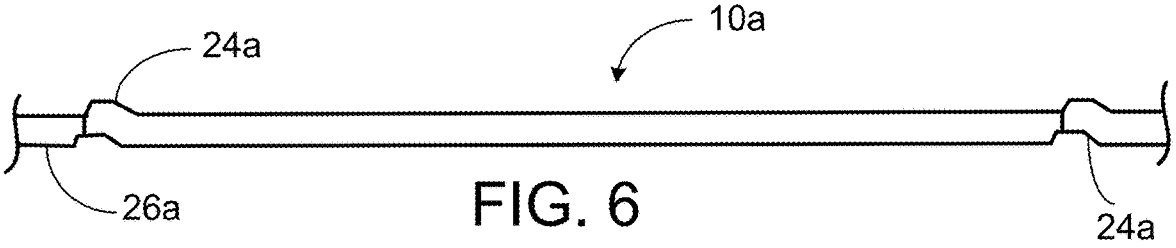
FIG. 6 is a partial top view of a connected row of touch fastening strips with a different head shape.

Referring to FIG. 6, a second embodiment of fastener strip **10*a* has a head end 24*a* and a tail end 26*a* of a slightly different shape than in the strip of FIG. 1**. As seen in the profile of the lateral edges at the leading and trailing ends, the row of strips has a transverse shape that perfectly nests with an identical row, leaving no waste to be trimmed from between rows of strips. This nesting is facilitated by forming a notch at the tail end of each strip, as shown.

Figure 7:
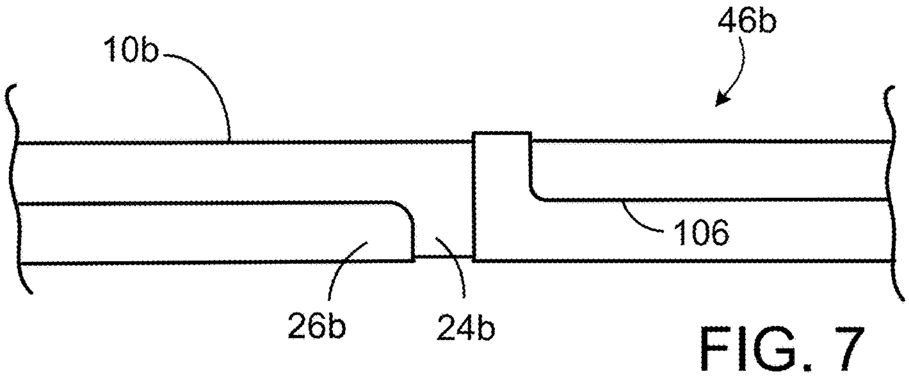
FIG. 7 is a top view of a sheet of fastening material die cut to form nested touch fastening strips of a third shape.

Referring next to FIG. 7, another sheet **46*b* of fastening material is die cut to define multiple fastening strips 10*b* of a different design. Each strip 10*b* is generally L-shaped, with a wider head end 24*b* than tail end 26*b*. The die cut pattern produces several double rows of strips, with each length of a double row containing two strips of alternate orientation. The die cut sheet is then split into individual double rows, such as the one shown in FIG. 7, for spooling. In this example, each head end 24*b*** is of a width almost twice that of the nominal width.

Figure 8:
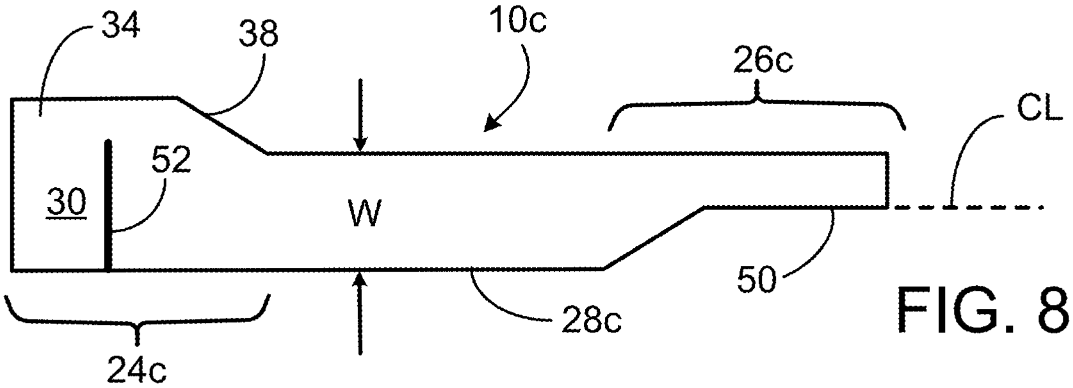
FIG. 8 is a top view of an elongated touch fastening strip of a fourth shape.

Referring next to FIG. 8, a fourth example of a fastening strip **10*c* has a head end 24*c* and a tail end 26*c* at either end of a central region 28*c*. The head end is of greater lateral width than the nominal width 'W' of the central portion. The tail end has a distal portion 50 that is of lesser lateral width than the nominal width. In this example, the contiguous area 30 of the head end is a convex region, meaning that it is an area such that, for every pair of points present within the area, every point on a straight line segment that joins the pair of the points is also contained within the area. As in the example of FIG. 1, the head area of strip 10*c* has a leading lateral edge segment 38** that extends at an oblique angle with respect to the centerline of the central region.

In this example, the contiguous area 30 defines a slit 52 extending into the area from an edge of the body of flexible material within the head end. The slit is longer than the lateral width of the distal portion 50 of the tail end of the body of flexible material. Both the head end **24*c* and the tail end 26*c*** are offset laterally with respect to the center line CL of the central region. In this example, both the head end and the tail end are offset laterally toward the same side of the fastening strip.

Figure 9A:
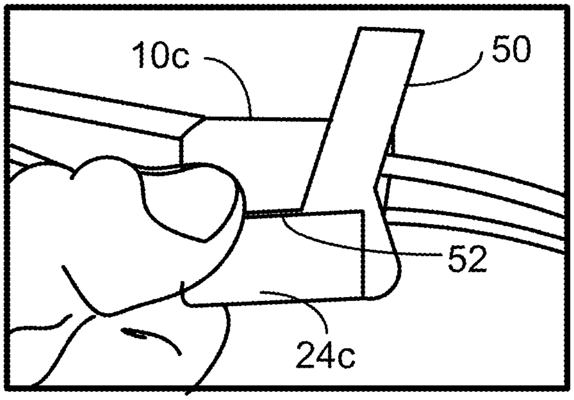
FIG. 9A illustrates the touch fastening strip of FIG. 8 being wrapped around a supporting wire and a vine.
Figure 9B:
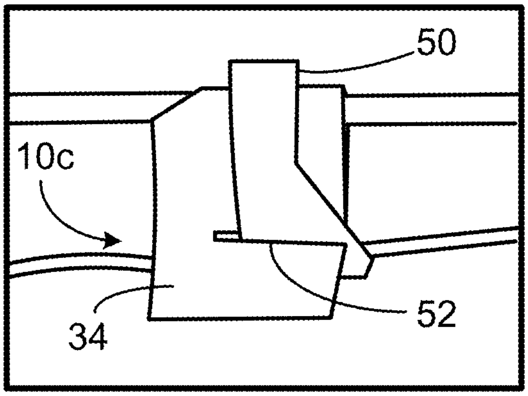
FIG. 9B shows the touch fastening strip of FIG. 9A after wrapping.

Referring also to FIGS. 9A and 9B, in use a user grasps the lateral tab 34 formed by the head end with one hand, wraps the rest of the strip about an object to be wrapped, inserts the tail end **26*c* of the strip into the slot, and engages the distal portion 50** of the tail end to the exposed strip surface.

Figure 10:
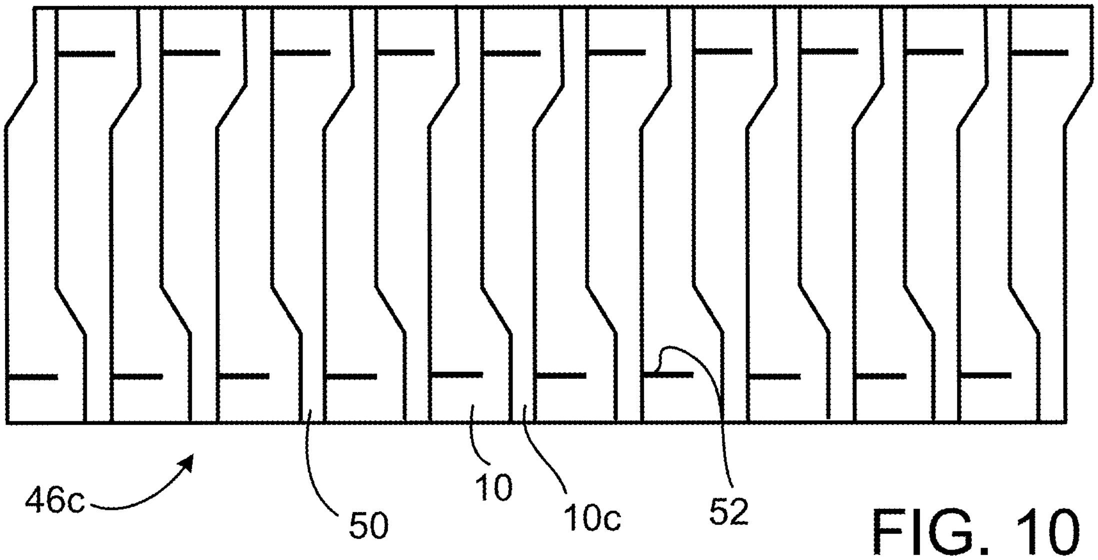
FIG. 10 is a top view of a sheet of fastening material die cut to form multiple touch fastening strips of FIG. 8.

Referring next to FIG. 10, a sheet **46*c* of fastening material is die cut to define multiple fastening strips 10*c***. In this example, the running length of the sheet is transverse to the length of each strip, with the head ends and tail ends of each strip alternating in the nested pattern. In this example, the nested strips occupy all of the area of the sheet, leaving no scrap material between strips or at the selvedges. As can be seen from the die cutting pattern, the lateral width of the head end plus the lateral width of the tail end equals twice the nominal width of the central region, facilitating such an efficient nesting.

Figure 11A:
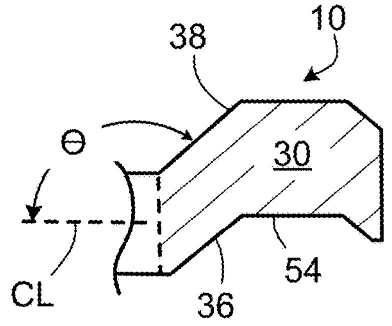
FIG. 11A shows the engagement area of the head portion of the touch fastening strip of FIG. 1.
Figure 11B:
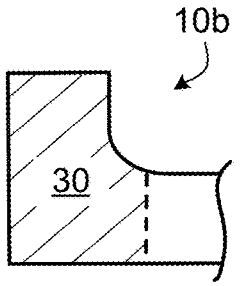
FIG. 11B shows the engagement area of the head portion of the touch fastening strip of FIG. 7.
Figure 11C:
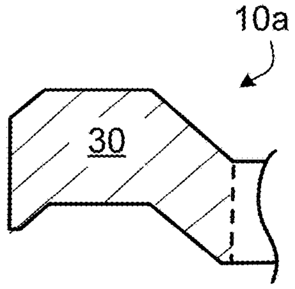
FIG. 11C shows the engagement area of the head portion of the touch fastening strip of FIG. 6.
Figure 11D:
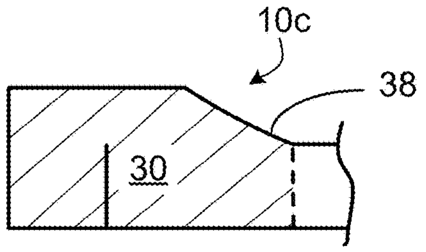
FIG. 11D shows the engagement area of the head portion of the touch fastening strip of FIG. 8.

Referring to FIGS. 11A-D, the contiguous engagement area 30 of each of the head regions discussed above is shown for clarity. In FIG. 11A, one of the lateral edges includes a lateral edge segment 54 bordering the contiguous area and parallel with the centerline CL of the central region and the lateral edges in the central region. The oblique angle Θ shown in FIG. 11A between the centerline CL of the central region of the strip and the leading lateral edge segment 38 is preferably between about 120 and 160 degrees.

Figure 12:
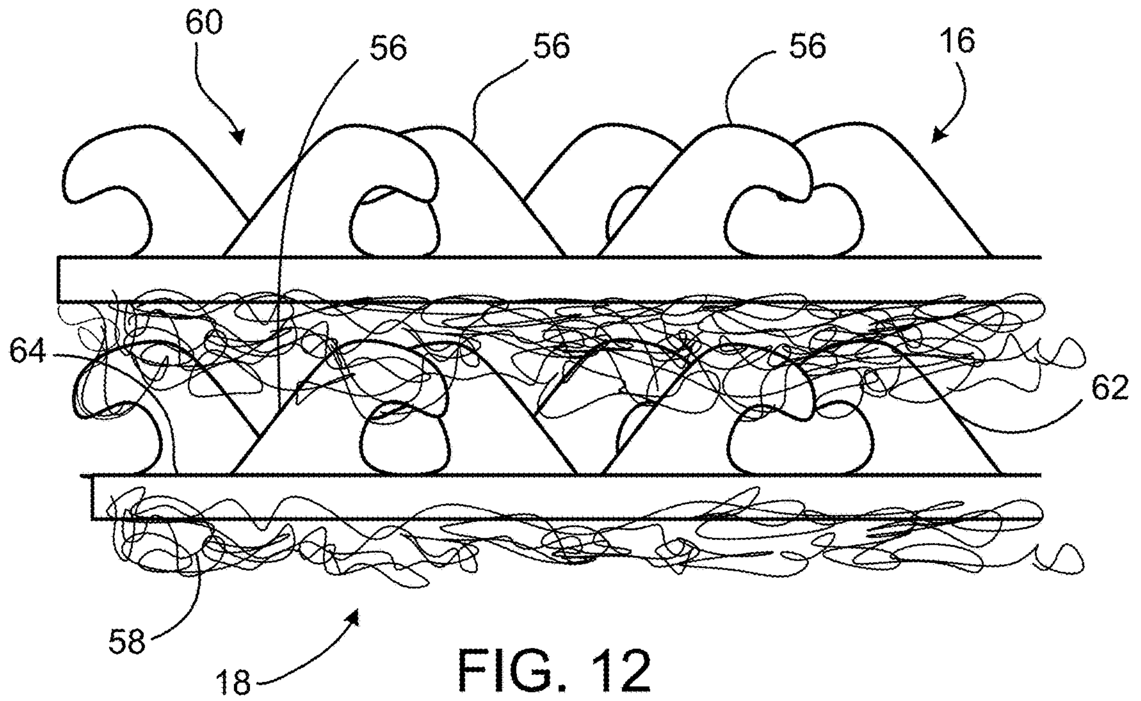
FIG. 12 is a partial side view of two adjacent courses of the roll of FIG. 2, showing the touch fastener elements on opposite sides of the fastening material.

Referring next to FIG. 12, the mutually engageable touch fastener elements on opposite sides of the fastening material include, on one side, an array 60 of male touch fastener elements 56 covering face 16, one of the two opposite faces, and hook-engageable fibers 58 disposed on face 18, the other of the opposite faces. The array 60 of male touch fastener elements includes parallel columns of male touch fastener elements extending along the length of the body of flexible material. Each of the male touch fastener elements 56 has a stem 62 of resin extending from and contiguous with a layer 64 of resin on face 60. In this example, the layer 64 of resin covers all of face 60. The engageable fibers on the opposite side of the strip may be fibers of a non-woven or a knit material, or individual yarns, for example, that are partially embedded in the resin of layer 64 to permanently bond the fibrous material to the resin layer while leaving segments of the fibers exposed and preferably extending from the resin surface for engagement. U.S. Pat. No. 5,260,015 by Kennedy et al, and numerous patents since, teach how to embed fibrous materials during molding of the resin layer and fastener elements. The fastener elements can be molded J-hooks as shown, or bidirectional (palm-tree) hooks with heads extending in the longitudinal direction of the strip, or mushroom fastener elements having heads overhanging stems on all sides. The latter can be formed by molding stems and then deforming distal ends of the stems to form the overhanging heads, or by molding the heads and stems in appropriately shaped cavities.

The peel resistance of the mated fastening strip can be enhanced by cutting the strip to form flaps that can deflect out of the plane of the material during disengagement, such as is taught in U.S. Pat. No. 8,545,740, the contents of which are hereby incorporated by reference. The connected edge or bend point of such flaps can be on the trailing side of the flap relative to the direction of peel, such that the fastener elements on the flap are placed in a shear release mode of engagement during peeling of the strip from itself.

The material of the touch fastener strip can be made as in a provisional patent application filed herewith by the same Applicant and entitled "Two-Sided Touch Fastener Material." Preferably, such material is oriented such that the longitudinally continuous bundles of fibers extend along the length of the strip, parallel to the centerline of the central region. The contents of that provisional application are hereby incorporated by reference in their entirety.

While a number of examples have been described for illustration purposes, the foregoing description is not intended to limit the scope of the invention, which is defined by the scope of the appended claims. There are and will be other examples and modifications within the scope of the following claims.

What is claimed is:

1. An elongated touch fastening strip, comprising a body of flexible material with two opposite faces bounded by lateral edges extending along a length of the body of flexible material; and mutually engageable touch fastener elements carried on the faces of the flexible material to releasably fasten overlapping portions of the fastener material together with the fastening strip wrapped about an object;

wherein the body of flexible material has two opposite ends, including a head end and a tail end, and a central region connecting the two opposite ends, the lateral edges defining a nominal width between opposite, parallel portions of the lateral edges of the body of flexible material in the central region; and wherein the head end comprises a contiguous area engageable over a width at least as great as the nominal width over an engageable head length, measured from a distal end of the head end opposite the central region, of at least half and no more than three times the nominal width, and wherein the head end extends asymmetrically toward one side of the fastening strip to form a lateral tab.

2. The elongated touch fastening strip of claim 1, wherein the body of flexible material has an essentially constant lateral width over the engageable head length.

3. The elongated touch fastening strip of claim 2, wherein the body of flexible material is of the lateral width over all of the length of the body of flexible material.

4. The elongated touch fastening strip of claim 1, wherein head end is of greater lateral width than the nominal width.

5. The elongated touch fastening strip of claim 1, wherein the tail end has a distal portion that is of lesser lateral width than the nominal width.

6. The elongated touch fastening strip of claim 1, wherein the engageable head length includes all portions of the head end of the strap in which the head end is asymmetric with respect to a centerline of the central region.

7. The elongated touch fastening strip of claim 1, wherein the lateral edges are linear throughout the central region.

8. The elongated touch fastening strip of claim 1, wherein the contiguous area is a convex region.

9. The elongated touch fastening strip of claim 1, wherein the contiguous area is void of apertures extending through the body of flexible material.

10. The elongated touch fastening strip of claim 1, wherein the contiguous area defines a slit extending into the area from an edge of the body of flexible material within the head end.

11. The elongated touch fastening strip of claim 10, wherein the slit is longer than a lateral width of the tail end of the body of flexible material.

12. The elongated touch fastening strip of claim 1, wherein a lateral width of the head end plus a lateral width of the tail end equals twice the nominal width of the central region.

13. The elongated touch fastening strip of claim 1, wherein one of the lateral edges includes a lateral edge segment bordering the contiguous area and parallel with the lateral edges in the central region.

14. The elongated touch fastening strip of claim 1, wherein one of the lateral edges includes a leading lateral edge segment bordering the head end and extending at an oblique angle to a centerline of the central region.

15. The elongated touch fastening strip of claim 1, wherein the mutually engageable touch fastener elements comprise: an array of male touch fastener elements covering one of the two opposite faces, and hook-engageable fibers disposed on the other of the opposite faces.

16. The elongated touch fastening strip of claim 1, wherein both the head end and the tail end are both offset laterally with respect to a center line of the central region.

17. The elongated touch fastening strip of claim 1, releasably connected to other fastening strips to form a set of fastening strips wrapped up as a roll of fastening strips and held in roll form by the mutually engageable touch fastener elements.

18. A sheet of fastening material die cut to define multiple fastening strips according to any of claims 1 through 16.

19. The sheet of fastening material of claim 18, wrapped up as a roll of fastening strips and held in roll form by the mutually engageable touch fastener elements.

20. A method of installing a touch fastening strip to support a portion of a growing plant, the method comprising:

placing the elongated touch fastening strip adjacent a portion of a growing plant and a plant support, the elongated touch fastening strip comprising:

a body of flexible material with two opposite faces bounded by lateral edges extending along a length of the body of flexible material; and mutually engageable touch fastener elements carried on the faces of the flexible material to releasably fasten overlapping portions of the fastener material together with the fastening strip wrapped about an object;

the body of flexible material having two opposite ends, including a head end and a tail end, and a central region connecting the two opposite ends, the lateral edges defining a nominal width between opposite, parallel edges of the body of flexible material in the central region; and the head end comprising a contiguous area engageable over a width at least as great as the nominal width over an engageable head length, measured from a distal end of the head end opposite the central region, of at least half and no more than three times the nominal width, and extending asymmetrically toward one side of the fastening strip to form a lateral tab;

gripping the lateral tab of the strip with one hand;

wrapping a remainder of the strip about the growing plant portion and the plant support while continuing to grip the lateral tab, such that the wrapped strip overlaps itself to engage the mutually engageable touch fastener elements and hold the strip in wrapped form; and then releasing the strip.

* * * * *